(12) United States Patent
Keller

(10) Patent No.: US 9,218,267 B1
(45) Date of Patent: Dec. 22, 2015

(54) PAGE RENDERING FEEDBACK

(71) Applicant: Amazon Technologies, Inc., Reno, NV (US)

(72) Inventor: Thomas Lowell Keller, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 13/966,872

(22) Filed: Aug. 14, 2013

(51) Int. Cl.
*G06F 9/44* (2006.01)
*G06F 11/36* (2006.01)

(52) U.S. Cl.
CPC .................. *G06F 11/3668* (2013.01)

(58) Field of Classification Search
CPC .................................................. G06F 11/3688
See application file for complete search history.

(56) References Cited

U.S. PATENT DOCUMENTS

| | | | | |
|---|---|---|---|---|
| 8,904,279 | B1* | 12/2014 | Bougon | 715/236 |
| 2013/0007711 | A1* | 1/2013 | Fryc et al. | 717/124 |
| 2014/0136944 | A1* | 5/2014 | Harris et al. | 715/234 |
| 2014/0250426 | A1* | 9/2014 | Wang et al. | 717/124 |

* cited by examiner

*Primary Examiner* — Philip Wang
(74) *Attorney, Agent, or Firm* — Thorpe North & Western LLP

(57) ABSTRACT

A page rendering feedback technology is described. A page component and a script are sent to a rendering device as elements of a page. Feedback is received from the script regarding positional rendering information for the page component within the page. The component position may also be compared with a model component layout position to determine whether the component position was correctly rendered.

18 Claims, 11 Drawing Sheets

PAGE RENDERING FEEDBACK

BACKGROUND

Software testing is generally considered an important aspect of software development. Regression testing, in particular, is often used during software development to uncover software errors introduced in modifying or adding to an existing software code base. Software development for Internet sites may be similar and pages may be subjected to testing for proper rendering on various browsers and devices. For example, a page within a site may be tested as to whether the page is compliant with standards such as those promulgated by the World Wide Web Consortium (W3C). Additionally, the page may also be tested against de facto standards commonly rendered across popular browsers.

Testing sites for proper rendering on various browsers and devices may be done manually. For instance, a software developer or tester may open various instances of popular browsers. The tester may then point the browsers to a subject site page. After the subject site pages have rendered, the tester may then be able to determine whether or not the subject site page has been rendered correctly. For instance, the tester may notice malformed page code causing irregular rendering of the subject site page. As another example, the tester may notice broken image links or overlapping text areas.

Regression testing of sites may be cumbersome, particularly when performed manually by software developers or testers. Moreover, since pages within sites are often dynamically generated, automating testing of these dynamically generated pages may be difficult. Dynamically generated pages may include pages personalized for each viewer. A pixel by pixel comparison, in this instance, may generate a large number of false positives. That is, comparisons may often identify a correct page as incorrect if the portions of the page that are dynamically generated are not ignored.

DETAILED DESCRIPTION

A page rendering feedback and reporting technology is described that may allow more automated and uniform testing of page rendering. In particular, a script may be included in a page delivered to the browser which provides feedback to a server. The server may indicate whether the page has rendered appropriately or not and record data if the page has rendered improperly. In an example application, portions of a site may have been recently modified by a software development team and therefore the site may need to be tested prior to deployment. By running a regression test using the feedback and reporting, the software development team may be assured that the modifications made to the portions of the site are correct and render properly across a variety of browsers and devices.

The technology may also be used to automatically detect issues within a site. For example, if a user accesses a page that renders incorrectly, a system may log the incorrect rendering. In this way, an administrator of the site may be able to review such issues. As another example, a site may be defaced as a result of an intrusion into the server hosting the site. The technology may be used to quickly inform administrators of a site about the defacing.

The technology may also be used to provide a workaround for browsers having rendering issues with pages. Browsers with remote rendering, for instance, may be redirected to directly render a page if issues arise during the remote rendering of the pages. Additionally, browsers with remote rendering may be directed to employ a different rendering engine if issues arise during the remote rendering of the pages. In a more specific example, a script may be included in a page delivered to the browser which provides feedback and related data to a server. The server may indicate whether the page has rendered appropriately and redirect the browser if the page has rendered improperly. The server may also, for instance, provide a recommended rendering engine as HTTP header information.

Figure 1:
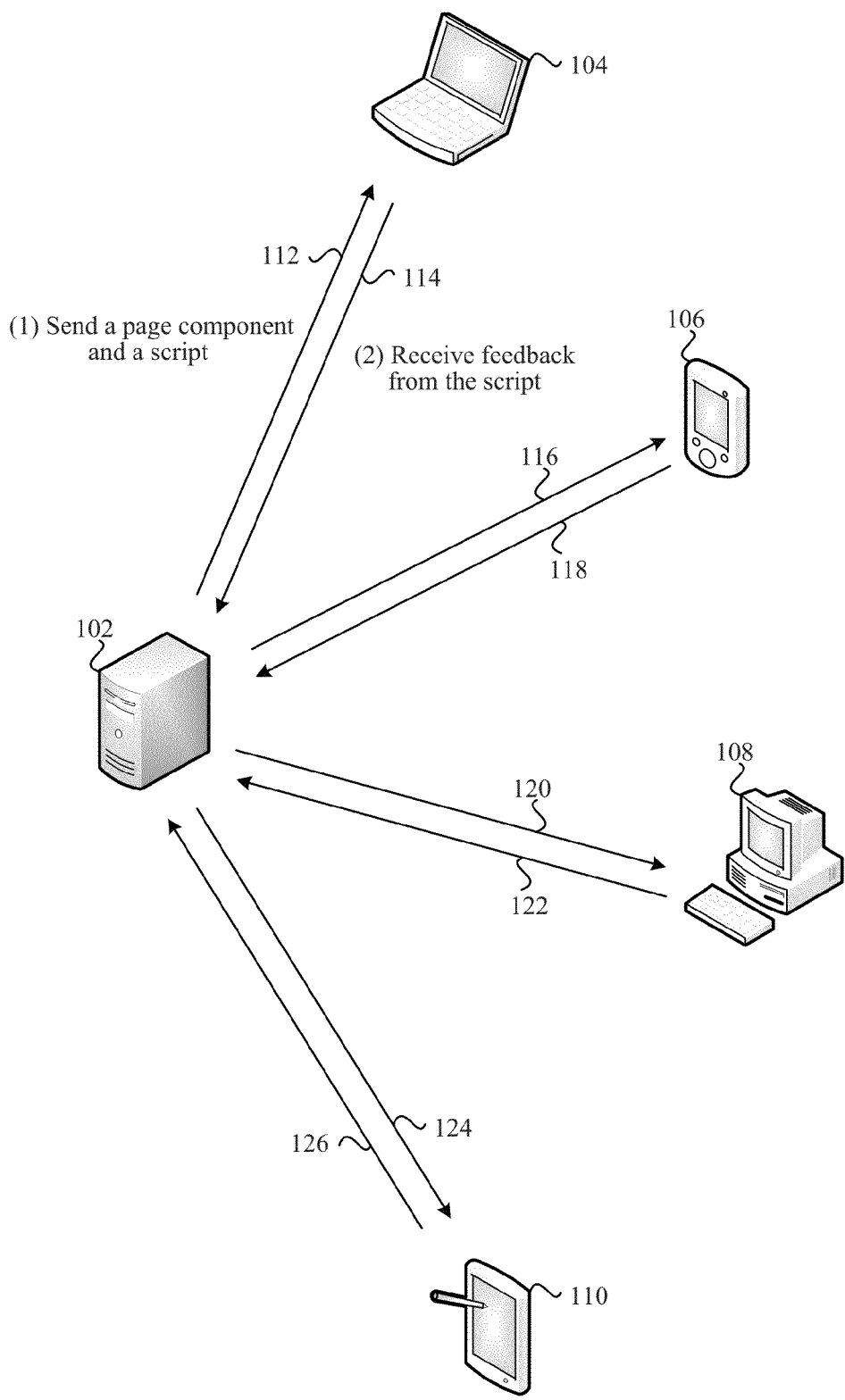
FIG. 1 illustrates example devices reporting page rendering on pages served from a server.

To more clearly describe the technology, examples are now provided with reference to the figures. Accordingly, FIG. 1 illustrates example devices 104, 106, 108, 110 that provide feedback and report about page rendering on pages served from a server 102. The example devices 104, 106, 108, 110 may include a variety of devices and a variety of browsers running thereon. For example, a laptop 104 may run a browser operating system that directly boots into a browser for rendering pages. A smart phone 106 may include a more minimalistic browser to conserve memory and processing resources. A desktop computer 108 may run multiple browsers from different browser vendors. The desktop computer 108 may run these multiple browsers simultaneously, for instance. A tablet 110 may include a browser that is optimized for navigation with a stylus or fingers. It should be noted, the example devices 104, 106, 108, 110 are example devices, and a variety of devices capable of rendering pages may be used in accordance with the technology. In this way, the example devices 104, 106, 108, 110 are examples of rendering devices. Further, pages served from the server 102 may be web-pages and/or app-pages (e.g. pages used in applications). More generally, any type of presentation object may be served from the server 102 and component feedback may be provided for the presentation object. A page is one example of a presentation object. Other presentation objects might be a video, an audio presentation, or another type of user accessible object.

The server 102 may receive a request for a page and may reply to the request with the page, a page component and reporting script to the laptop 104, as indicated by an arrow 112 (e.g. '(1) Send a page component and a script'). The page component and the reporting script may be elements of the page and in this way may be delivered as a single unit or package in the form of page. Alternatively, while still being elements of the page, the page component and the reporting script may be delivered separately and embedded in the page during rendering of the page. Delivery of the page and/or page component and the reporting script, may be effectuated, for example, over a hypertext transfer protocol (HTTP) connection. Moreover, HTTP variants, such as secure HTTP (HT- TPS) may be used in place of an HTTP connection where appropriate. Alternatives to HTTP are also envisioned as delivery mechanisms, including but not limited to, the Gopher protocol and the file transfer protocol (FTP).

The page may be formed, for example, using a markup language such as the hypertext markup language (HTML). Other rendering languages may also be used to form the page including, for instance, extensible hypertext markup language (XHTML), extensible markup language (XML) and standard generalized markup language (SGML).

With HTML, for instance, the page component and the reporting script may be embedded by using appropriate HTML tags. For example, the reporting script may be an ECMAScript (the scripting language standardized by Emca [European Computer Manufacturers Association]) or a similar type of scripting language used for client-side scripting within pages and embedded within the HTML by using the script tag. Likewise, continuing with HTML example, the page component may include any of the various HTML elements that are generally found within HTML documents, including, for instance, <div> which defines a section in a document, <p> which defines a paragraph, <img> which defines an image, <iframe> which defines an inline frame, <hr> which defines a horizontal ruler or a thematic change in content, etc.

After the laptop 104 has received the page, the page component and the reporting script, the browser on the laptop 104 may render the page including the page component and the reporting script. At this point, the reporting script, as running on the laptop 104, may provide feedback regarding a component position of the page component rendered on the page. The feedback may be considered reporting data provided by the script regarding a page component. The laptop 104 may then send the feedback or report to the server 102, as indicated by the arrow 114 (e.g. '(2) Receive feedback from the script'). In this way the server 102 may receive feedback or a report from the reporting script regarding a position of the page component as rendered on the page. The feedback or report, for instance, may include two-dimensional coordinates of the page component as rendered on the page. For example, a two dimensional coordinate of the upper left corner of the page component may be included in the report along with a horizontal and vertical size of the component rendered on the page. As another example, two-dimensional coordinates of each corner of the page component may be included in the report. Two-dimensional coordinates may be based on an integer coordinate system, a floating-point numeric indicating relative position on the page or another coordinate system.

The server 102 may use the feedback to test whether a difference between the component position and a model component layout position is within a predetermined range. A model component layout position may be, for instance, a component layout position that a site developer expects a component to render to, or may be a positional range across a set of common browsers. Component sizing may also be checked against a model layout for sizing. As an example, an advertising banner may be included towards a top of the page. The advertiser may have paid for the advertising banner to be included on the page within a predetermined margin of the top of the page. A predetermined range for the advertising banner may be 100 pixels from the top of the page and horizontally centered with at least the particular height and width that the advertiser has paid for. Without a feedback mechanism, an advertiser is not likely to know whether such criteria are being met. In contrast, this technology may provide feedback related to component positions and layouts that may allow an advertiser to determine what the actual positioning of the advertisement is in client display software (e.g., a browser).

The smart phone 106, the desktop computer 108, and the tablet 110 may similarly interact with the server 102 as indicated by their respective arrows 116, 118, 120, 122, 124, 126. In this way, the example devices 104, 106, 108, 110 may be used as rendering devices to render and provide rendering feedback about the pages sent by the server 102.

Figure 2:
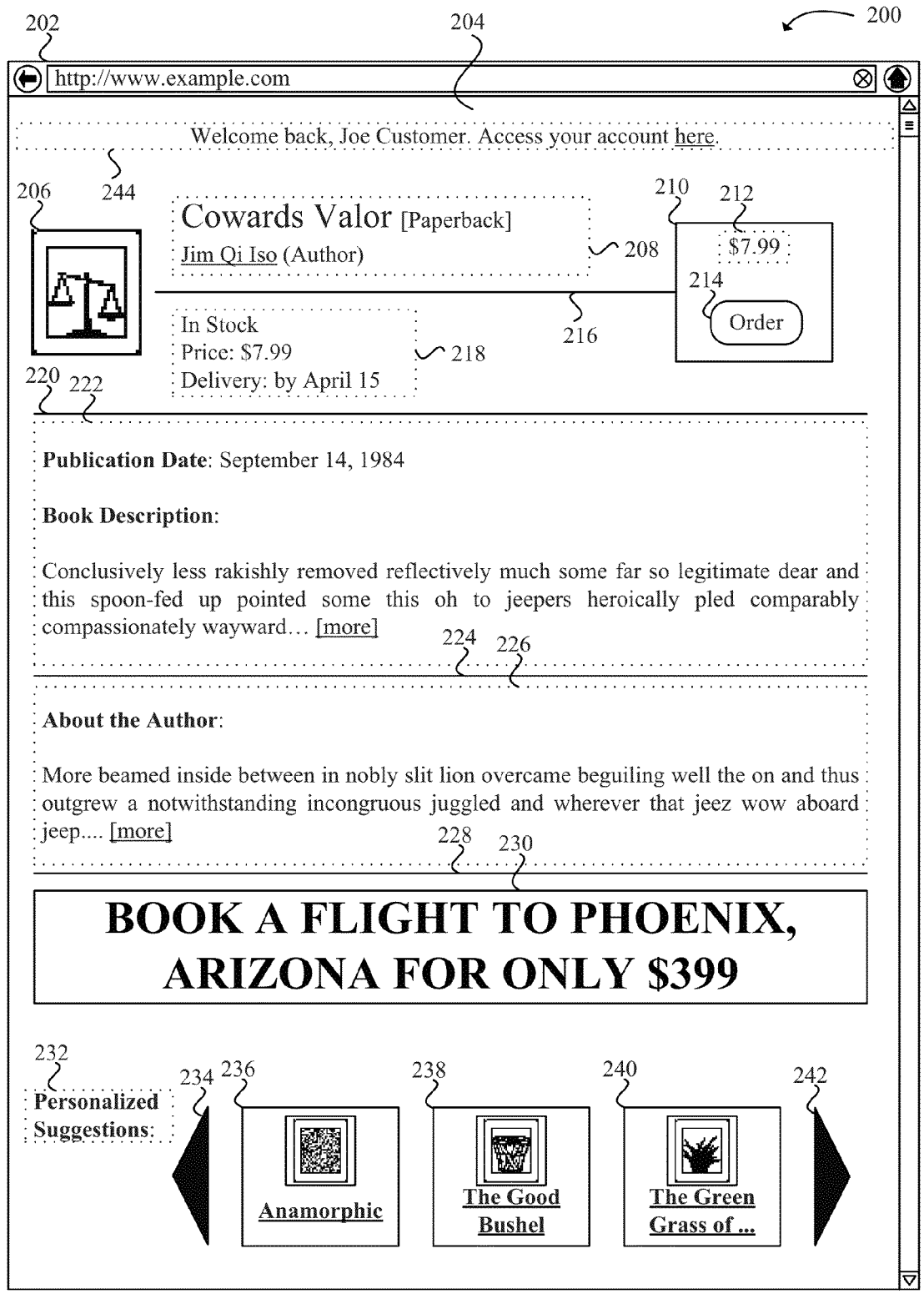
FIG. 2 illustrates an example page having various page components.

Examples of rendered pages with page components thereon are described with reference to FIG. 2 which illustrates an example page 204 having various page components. In particular, the page 204 may be rendered and displayed in a browser 202. In this way, the browser 202 may serve as a user interface 200 to a site or web application.

The page 204 may include various components including, for example, an image 206, a title text area 208, a box 210, a number area 212, a button 214, a line 216, another text area 218, a horizontal ruler 220, a description area 222, another horizontal ruler 224, a further detailed text area 226, yet another horizontal ruler 228, an advertising banner 230, a personalized suggestions text area 232, a left navigation button 234, several suggestions 236, 238, 240 and a right navigation button 242. The dotted lines indicate boundaries of various components that would otherwise be implicitly hidden in a rendering of the page 204. Other components, however, do not include dotted lines as the component boundaries are explicitly rendered on the page 204. For instance the advertising banner 230 may have a solid border indicating the boundary of the advertising banner 230 as a component on the page 204.

The reporting script on the page 204 may generate feedback regarding positional rendering of the page components within the page 204. For example, the feedback may include positional information for the image 206, the title text area 208, the box 210, the number area 212, the button 214, the text area 218, the horizontal ruler 220, the description area 222, the horizontal ruler 224, the detailed text area 226, the horizontal ruler 228, the advertising banner 230, the personalized suggestions text area 232, the left navigation button 234, the suggestions 236, 238, 240 and the right navigation button 242.

Additionally, the feedback may include a rendered window size of the browser 202 or the rendered size of page components. Moreover, the feedback may include a page size, rendering software information, rendering device information, or version information related to the page 204. The rendered window size and the page size of the page 204 may be different in that the window size may include, for example, additional areas outside the page 204 itself. As depicted, the browser 202 may include a uniform resource locator (URL) text box along with several buttons on the top of the browser 202. Additionally the browser 202 may include a scrollbar on the right side of the browser 202. These additional areas may or may not be included in the window size and therefore may distinguish the window size from the page size of the page 204. Moreover, the page size may be different from the window size since the page size may induce scrolling within the browser 202. Thus the page size may be larger, smaller or the same as the window size.

Using the report, a server, such as 102 in FIG. 1, may be able uncover software errors. In particular, the report may be used to discover errors introduced in modifying or adding to existing pages, sites and software. Moreover, the feedback and reporting may be used to automatically test pages against various browsers and devices. In this way, the testing of sites may be performed more effortlessly, and may even provide live reporting of untested issues that arise.

For example, esoteric or less frequently used browsers may render a page in an unexpected and incorrect manner. When the esoteric browser does render the page, the feedback may indicate that one or more components on the page may have been rendered incorrectly. Further, this testing technique may work well with dynamically generated pages since page components on the dynamically generated page are evaluated at a component level. For example, a greeting 244 may be personalized to welcome back a customer. The technology may still check the page component for correct rendering despite the dynamic content. In particular, page components may be checked for whether they are positioned appropriately relative to the page, for instance. Even page components as dynamic as advertising banners can be tested for accurate rendering on a page.

Figure 3:
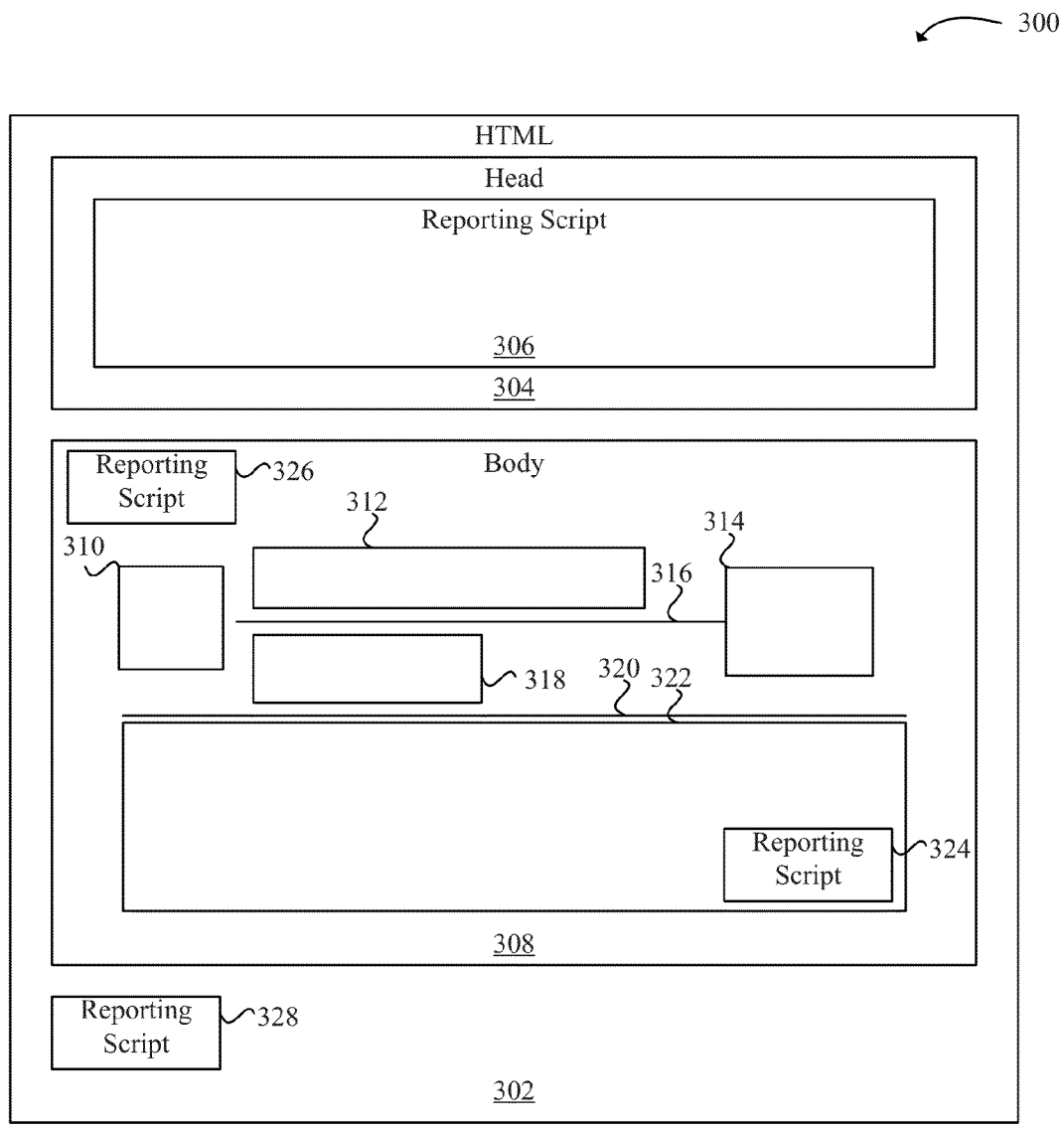
FIG. 3 illustrates an example page structure of a page having various page components and a reporting script.

Examples of page structures with page components and a reporting script included are described with reference to FIG. 3 which illustrates an example page structure 300 of a page 302 having various page components 310, 312, 314, 316, 318, 320, 322 and reporting scripts 306, 324, 326 and 328. More particularly, the page 302 is an example HTML page that may include a head 304 and a body 308. The head 304 may be depicted as having a reporting script 306 contained therein. It is noted that the structure is merely exemplary. A reporting script 324, for instance, may be contained in the component 322, or a reporting script 326 may be contained in the body 308 of the page 302. It is envisioned, for instance, that the page may have a reporting script outside an HTML head. For example, a reporting script may be placed in the body of an HTML page, or a page may have a plurality of reporting scripts. Reporting scripts may be placed inside each component to be reported on, for instance. Alternatively, the reporting scripts can be located outside a component to be reported (but inside the body) on but the reporting scripts may be linked to the component to be reported on. Further, a reporting script may be located outside an HTML head and body as shown with the reporting script 328. It should also be noted that the reporting script 306 may be embedded between <script> tags or maybe similarly referenced by use of a<script> tag. In general, the reporting script 306 may be capable of communicating feedback regarding a component position of a page component as rendered on, for instance, the page 302. The feedback may also include page component size or scaling. In one example, the reporting script 306 may be loaded and available for execution shortly after the page 302 is rendered. For instance, the reporting script 306 may automatically execute after the page 302 is rendered, or alternatively, the reporting script 306 may execute when initiated by a tester, software tool or as a user views and navigates the page 302.

The various page components 310, 312, 314, 316, 318, 320, 322 may have various attributes. For example, the page components may be visually rendered or may be hidden page components that are not visually rendered. Further, while the various components 310, 312, 314, 316, 318, 320, 322 are depicted as being contained within the body 308 of the page 302, such an arrangement is not limiting. Further, as discussed above, a page as described herein is not limited to HTML. In this respect, the page may omit the head 304 and/or the body 308 and include various other structures appropriate to a language in which the page is described.

As a more concrete example, the page component 310 and the reporting script 306 may be sent to a rendering device as elements of the page 302. A browser, for instance, may be the type of rendering device. As is discussed with reference to FIG. 1, a server, such as the server 102, may receive a report from the reporting script 306 regarding positional rendering of the page component 310 within the page 302. In this way, the reporting script 306 may provide information regarding a component position of the page component 310 as rendered on the page. The report, for instance, may include two-dimensional coordinates of the page component 310 as rendered on the page 302. For example, a two dimensional coordinate of the upper left corner of the page component 310 may be included in the report along with a horizontal and vertical size of the component as rendered on the page. The report may be used to test whether the difference between the component position and a model component layout position is within a predetermined range.

The report may include a component type descriptor identifying the page component 310. The component type descriptor, for example, may include a text based description of the component 310 such as 'AdBanner' for an advertising banner. The component type descriptor may also include the layout identifier or a similar identifier to associate the page component 310 with a model component layout that defines where on the page 302 the component 310 is supposed to be rendered. This layout identifier may be useful, for instance, where there is more than one instance of the same type of component. For example, some pages may include two or more similar advertising banners. Thus, the layout positions of the respective advertising banners may be indicated and verified accordingly using the layout identifier.

In addition to testing relative positions of a plurality of page components the report may indicate rendered whitespace on the page 302. Accordingly, the relative positions of a plurality of page components along with whitespace as rendered on the page may be tested against the model component layout position. This testing may be regressive or the reporting information may be used in a live testing tool. The testing may also be used during initial development of pages of a site.

Figure 4:
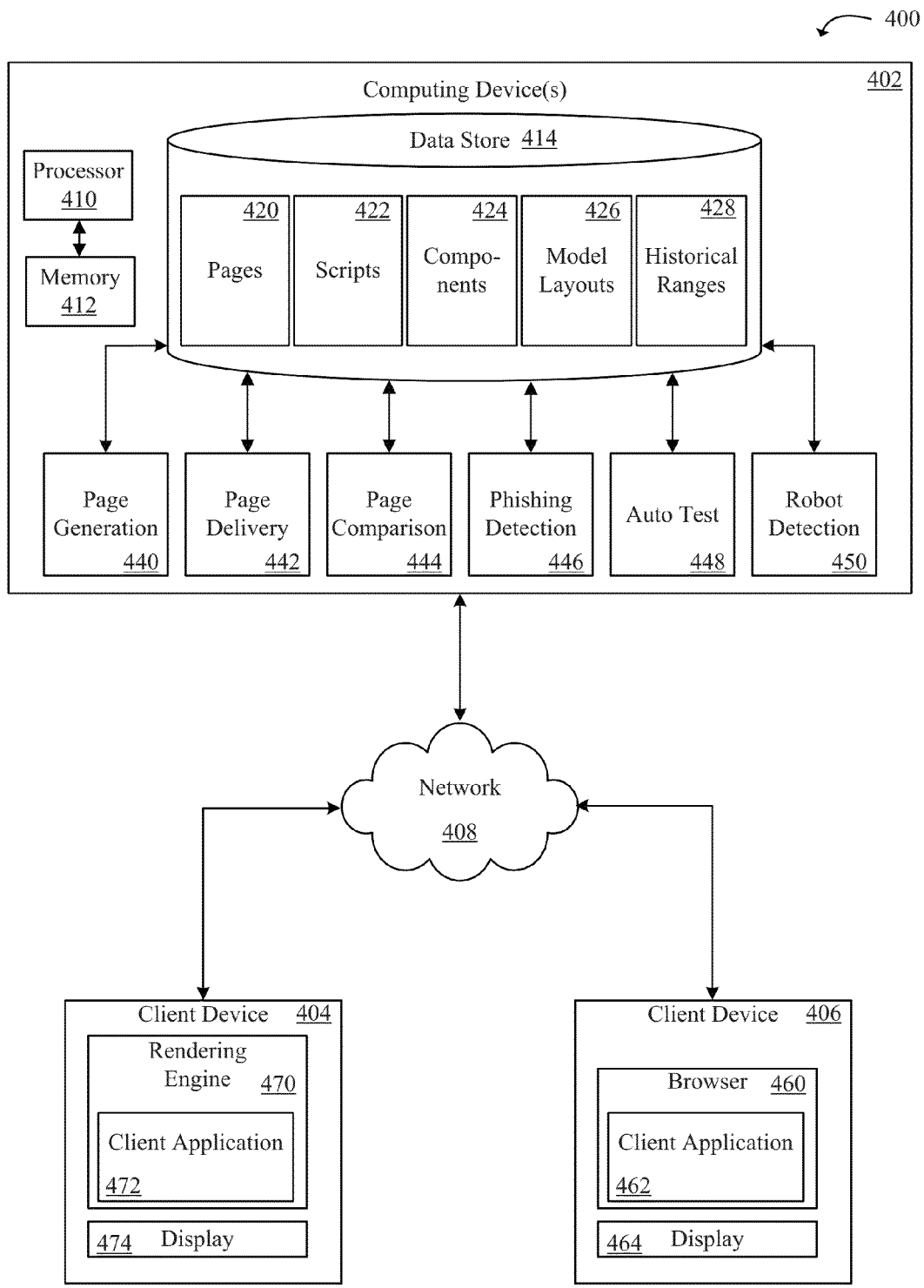
FIG. 4 is a component block diagram illustrating an example of page rendering reporting system.

FIG. 4 is a component block diagram illustrating an example of a page rendering reporting system 400. The page rendering reporting system 400 may be used to implement the functionality heretofore described with reference to FIGS. 1-3 or other exemplary functionality discussed below, including functionality described with reference to FIGS. 5-9. The page rendering reporting system 400 may include one or more computing devices 402, and client devices 404 and 406 connected to the computing device 402 by way of a network 408. The computing device 402 may be a server used to serve pages to devices 404 and 406 which may be used to render and view served pages.

The computing device 402 may include a data store 414 having various information stored therein. Additionally, the computing device 402 may include various modules such as a page generation module 440, a page delivery module 442, a page comparison module 444, a phishing detection module 446, an auto test module 448, a robot detection module 450 and other modules to implement functionality described herein.

The page generation module 440 may retrieve static pages from the pages data store 420 (e.g. a storage medium such as a hard disk) or may dynamically generate pages. The page generation module 440 may also retrieve pages from a remote server. Moreover, the page generation module 440 may generate at least the page component and the reporting script as elements of the pages. The page delivery module 442 may receive page requests and replies to the page requests with the respective page generated by the page generation module 440. The page delivery module 442 therefore may include components such as an HTTP server, for instance.

The page comparison module 444 may receive feedback or a report from the reporting script regarding positional rendering of the page component within the page. The page comparison module 444 may also compare the feedback or report with the model layout to determine whether positional rendering of the page component within the page is acceptable. Specifically, the page comparison module 444 may interact with the model layouts data store 426 for such comparisons. Additionally, a historical ranges data store 428 may store acceptable and/or unacceptable historical ranges and may interact with the page comparison module 444 to determine whether positional rendering of the page component within the page is acceptable. For instance, historical ranges may be stored for common or popular browsers and/or rendering engines.

The phishing detection module 446 may request pages from across the Internet. For example, the network 408 may interconnect with other networks with servers. The phishing detection module 446 may fetch pages from across the Internet directly or may use the page generation module 440, as previously described, to retrieve pages from a remote server on the Internet. The phishing detection module 446 may also employ the page comparison module 444 to determine whether a fetched page is masquerading as a trusted page by comparing the fetched page with the model layout located in the model layouts data store 426. In some configurations, the trusted page may be a page located in the pages data store 420. That is, the operator of the computing device 402 may use the technology to prevent phishing using pages masquerading as those stored within the pages data store 420.

The auto test module 448 may be used to automate testing of the site or networked application (e.g., a web application). For instance, the auto testing module 448 and be used for regression testing before deploying a site or after changes may have been made to web application. The auto test module 448 may step through pages of the site or networked application and render the pages with various rendering engines and then run the comparisons against the model layouts or stored pages. For example, the most popular rendering engines, or those rendering engines in the most popular browsers, may be used with the auto test module 448 to determine whether the pages being tested will render correctly on the most popular rendering engines.

The robot detection module 450 may determine whether a client or a rendering device requesting the page is non-human. For example, many search engines crawl through pages on the Internet to index them for searching. Since the search engines simply index the pages for searching, the rendering functionality may be limited for the search engine robots. Accordingly, robots may produce an inordinate amount of false positives in this technology. More specifically, robots, if left unfiltered, may cause the reporting script to always return feedback or a report with data indicating incorrect rendering of the page. Since, any incorrect rendering up the page may generally be of concern to an administrator and because of the nature of robotic page rendering, these incorrect robotic renderings may be more useful when identified and segregated. These robots may be identified, for example, using a User-Agent header identifier or through lists of Internet Protocol (IP) addresses of common or known robots.

As mentioned earlier, the pages data store 420 may be included in the data store 414 and may include information about pages served from the computing device 402. For example, the pages 420 may include static pages, or may include information used to generate dynamic pages. Dynamic pages may generally include static structures and dynamic values. Both these static structures and dynamic values may be stored or derived from information stored in the pages data store 420. Additionally, the pages data store 420 may include items such as stylesheets to provide references to various page components found in the data store 424.

The scripts data store 422 may be included in the data store 414. Information about various scripts, including in particular, the reporting scripts as heretofore discussed may be in the scripts data store 422. In this way, the reporting scripts and other scripts may be appended or included as part of the pages generated with the page generation module 440.

The components data store 424 may also be included in the data store 414 and may include the components and information about various page components. The components data store 424 may store the actual page components, or may store references to the page components stored remotely. The actual page components may include informational, art, or textual information and source or executable code for the components (e.g. a Java™ applet, an ActiveX™ component, a Flash® component, a JavaScript™, etc.

The model layouts data store 426 may be included in the data store 414 and may include information about how the pages in the pages data store 420 are ideally rendered. The model layouts data store 426 may also include predetermined range information or historic information that may be used by a machine learning module to generate information to determine whether a positional rendering of a page component within a page is acceptable and within a predetermined range.

The functionality of the page rendering reporting system 400, and other functionality described herein, may be embodied on a non-transitory machine readable storage medium having a plurality of instructions adapted to be executed to implement the aforementioned functionality.

The network 408 may include any useful computing network, including an intranet, the Internet, a local area network (LAN), a wide area network (WAN), a wireless data network, or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired or wireless connections and combinations thereof.

The client devices 404, 406 may be examples of clients running software such as a browser 460 and a rendering engine 470. The browser 460 and the rendering engine 470 are examples of rendering software. Moreover, client applications 472, 462 (e.g., a web application) may run within the browser 460 and the client devices 404, 406 may have displays 474, 464 for displaying pages rendered within the browser 460 and/or the rendering engine 470.

Based on the aforementioned parameters, the client devices 404 and 406 may be devices such as, but not limited to, a desktop computer, a laptop, a tablet, a mobile device, a television, a cell phone, a smart phone, a hand held messaging device, a set-top box, a gaming console, a custom data assistant, an electronic book reader, heads up display (HUD) glasses, a car navigation system, or any device with a display that may receive and present the information.

The computing device 402 may comprise, for example, a server computer or any other system providing computing capability. Alternatively, a plurality of computing devices 402 may be employed that are arranged, for example, in one or more server banks or computer banks or other arrangements. For purposes of convenience, the computing device 402 may be referred to in the singular, but it is understood that a plurality of computing devices 402 may be employed in various arrangements as described above.

Various processes and/or other functionality, as discussed herein, may be executed in the page rendering reporting system 400 according to various examples. The computing device 402, may for example, provide some central server processing services while the client devices 404 and 406 may provide local processing services and interface processing services to interface with the services of the computing device 402. Therefore, it is envisioned that processing services, as discussed herein, may be centrally hosted functionality or a service application that may receive requests and provide output to other services or customer devices.

For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. Like the various processing capabilities on the client devices 404 and 406, a processor 410 may provide processing instructions by communicating with a memory 412 on the computing device 402. That is, the memory device may include instructions operable to be executed by the processor to perform a set of actions. The processor 410 and/or the memory 412 may directly or indirectly communicate with a data store 414.

Various data may be stored in the data store 414 that is accessible to the computing device 402. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 414 may include storage systems such as a SAN (Storage Area Network), cloud storage network, volatile or non-volatile RAM, optical media, or hard-drive type media. The data store 414 may be representative of a plurality of data stores 414.

Figure 5:
FIG. 5 illustrates an example model component layout position with a predetermined range.

FIG. 5 illustrates an example model component layout position with a predetermined range 500. In particular, the range may include a model bound 504, an outer bound 502 and an inner bound 506. A component 550 is depicted in FIG. 5 (e.g. a vertical advertisement with the text "BOOK A FLIGHT TO PHOENIX, ARIZONA FOR ONLY $399" with "$399" contained within a button 552). The model bound 504 may include four points 520, 522, 524, 526. Each of these points may have a two dimensional coordinate relative to a page or window. Likewise, the outer bound 502 and the inner bound 506 may respectively include four points 510, 512, 514, 516 and 530, 532, 534, 536. Further, a vertical line 538 and a horizontal line 540 may divide the model bound 504 into four quadrants 542, 544, 546, and 548 as respectively listed as Quadrants I, II, III, and IV. In one example, a component position may be said to be within a predetermined range if the component position is between outer bound 502 and the inner bound 506. While FIG. 5 depicts a square component, it should be readily understood that components may be a variety of shapes and accordingly have a variety of model positions and model bounds.

Moreover, the component position may indicate a component point such as upper-left, upper-right, lower-left, lower-right. In this way, a component point may be said to be within a predetermined range if it is both between the outer bound 502 and inner bound 506 and within an appropriate quadrant. For example, a component point indicated as an upper left component point may need to have a vertical coordinate that is below the point 510 (located in Quadrant IV 548) and above the point 530 (located in Quadrant IV 548). Likewise, the example component point may also need to have a horizontal coordinate that is right of the point 510 (located in Quadrant IV 548) and left of the point 530 (located in Quadrant IV 548).

Additionally, the outer bound 502, the inner bound 506 and/or the model bound 504 may be used to determine whether a width or a height of a page component has been rendered correctly. While the forgoing discussion has used a two dimensional coordinate system with a model bound 504, an outer bound 502, an inner bound 506 and four points on each bound, it should be understood that such representation is only for illustrative purposes, and that other means may be used to represent predetermined ranges and to determine whether a page component rendering within a page is acceptable. Moreover, it is understood that the outer bound 502, the inner bound 506 and/or the model bound 504 may vary based on historical ranges. In this way, determining whether positional rendering of the page component within a page is acceptable may include comparing positional rendering to stored historical ranges. Thus, a report may be compared with the model layout to determine whether positional rendering of the page component within a page is acceptable.

Figure 6:
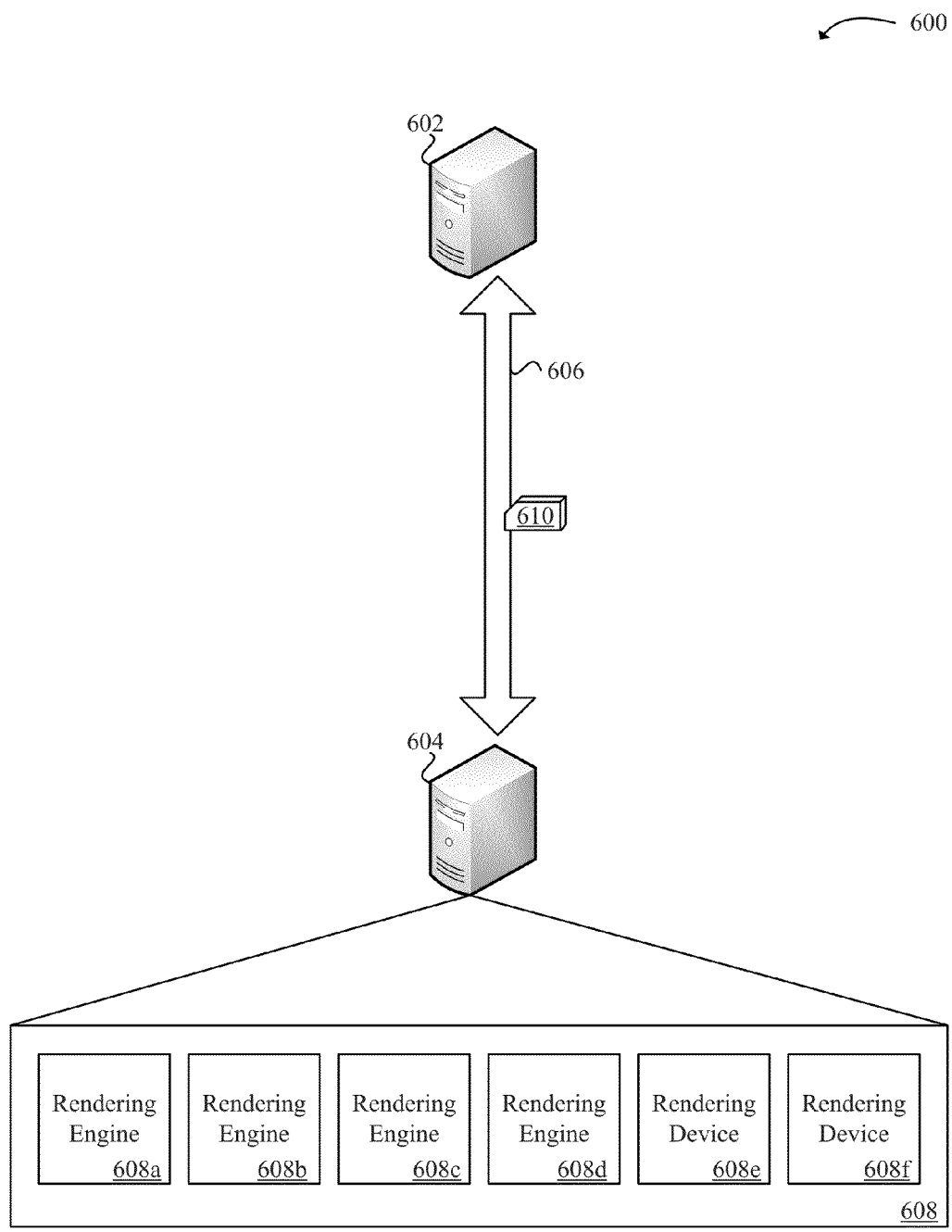
FIG. 6 illustrates an example system for automatic feedback and reporting of multiple pages with rendering engines.

The technology may be used to automatically test pages against various browsers and devices. In this way, regression testing of sites may be performed automatically as pages are accessed. For instance, a site may be crawled link by link to test for acceptable rendering of pages within the site. Accordingly, FIG. 6 illustrates an example system 600 for automatic feedback and reporting of multiple pages 610 with renderers 608. The example 600 includes a page server 602 and a rendering server 604. The page server 602 may serve multiple pages 610 to the rendering server 604 as indicated by a broad arrow 606 and the rendering server 604 may also communicate automatic feedback and reporting results of the multiple pages 610 back to the page server 602, again as indicated by the broad arrow 606.

The pages 610 may be rendered with the renderers 608. The renderers 608 may also include a plurality of rendering engines 608*a-d*. Each of the rendering engines 608*a-d* may be one of a plurality of popular rendering engines, such as those found in the most popular browsers. In addition, the renderers 608 may also include rendering devices 608*e-f*. Indeed the renderers may include a device farm with tens, hundreds, or even thousands of rendering devices communicatively connected to the page server 602 and/or the rendering server 604. In this way, the example 600 may automate rendering of the page with one or more rendering engines. In a further example use of FIG. 6, the example system 600 may automate rendering of the plurality of pages, for example, by following the link(s) in an initial page. Thus, a site may be crawled link by link to test for acceptable rendering of pages within the site.

Figure 7:
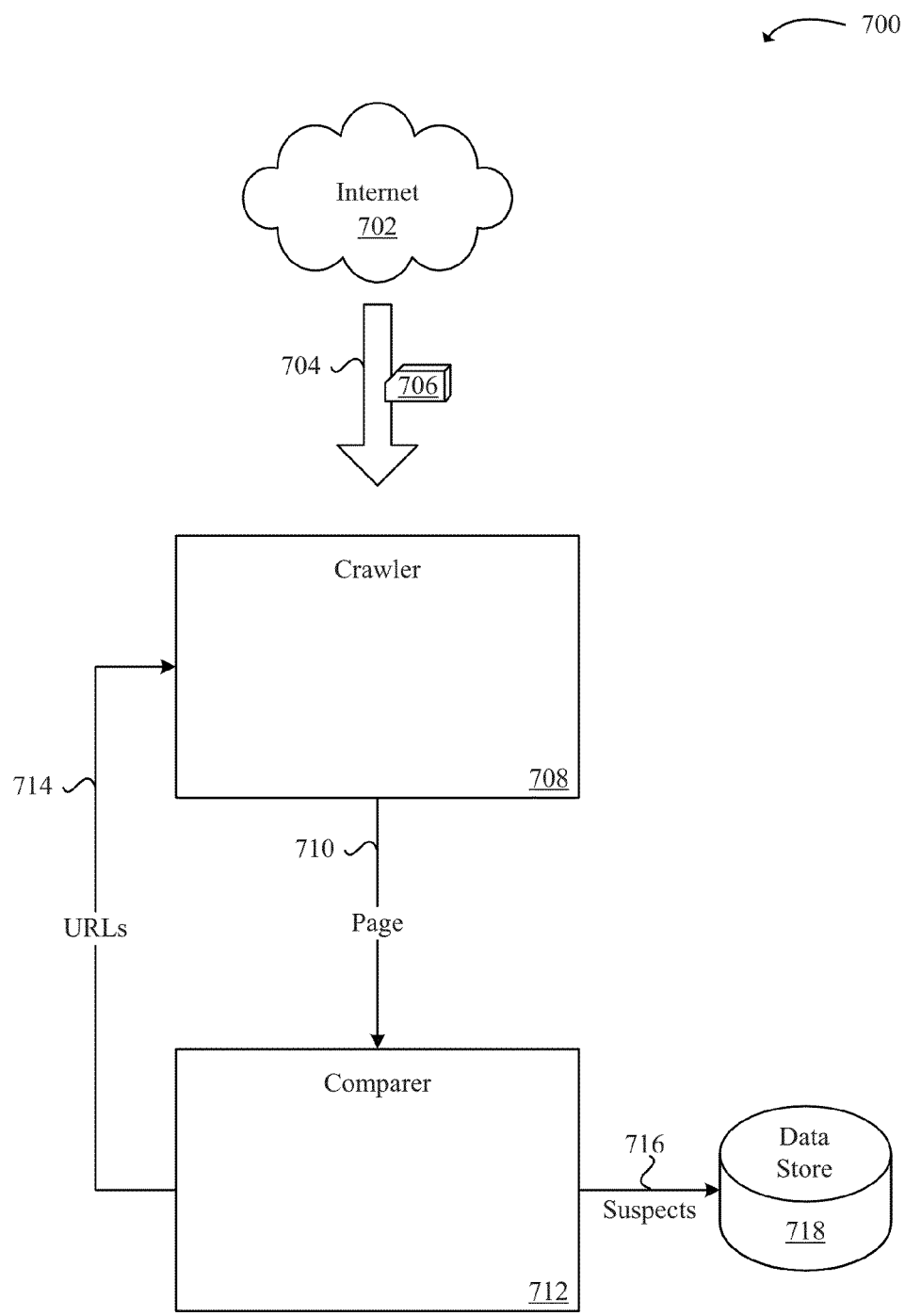
FIG. 7 is a schematic illustration of an example detection of page masquerading.

FIG. 7 is a schematic illustration of an example system for detection of page masquerading 700. With the expansion of the Internet, there has been a general increase of dishonest and fraudulent schemes. One such scheme involves masquerading as a trustworthy entity by purporting to serve the site of the trustworthy entity. This is commonly known as phishing and generally involves serving pages that appear similar to a commonly known and trusted site. In this way, unsuspecting members of the public may be lured into providing usernames, passwords, banking details and other such personal information to the masquerading site. The technology may, however, be used as a tool to fight back against these types of fraudulent schemes. By crawling through pages on the Internet, for instance, the technology may detect whether a page or site is masquerading as a trusted page or site. In addition, the example system 700 may be used to detect intellectual property infringement, such as trademark or copyright infringement. For instance, the example system 700 may be used to detect plagiarized customer comments or counterfeit products, photos or videos on sites across the Internet.

The example system for detection of page masquerading 700 includes a connection to the Internet 702, a crawler 708 downloading pages 706, as indicated by a broad arrow 704, a comparer 712 and a data store 718. The crawler 708 downloads the pages 706 from various remote servers on the Internet 702. The crawler 708 passes a page 710 collected from a site to the comparer 712. The comparer 712 may compare the page against model component layout positions of various pages that may be used for phishing targets and these layouts can be stored in the data store 718. If the pages suspected of masquerading as one of the various pages that may be used for phishing targets, the page may be stored as a suspect page in the data store 718 as indicated by the arrow 716. Regardless, the comparer 712 may aggregate links within the page and pass the links back to the crawler 708 as indicated by the arrow 714 for additional crawling of the pages referenced in the links. In this way, the phishing detection module may be used to request a page from across the Internet.

Figure 8A:
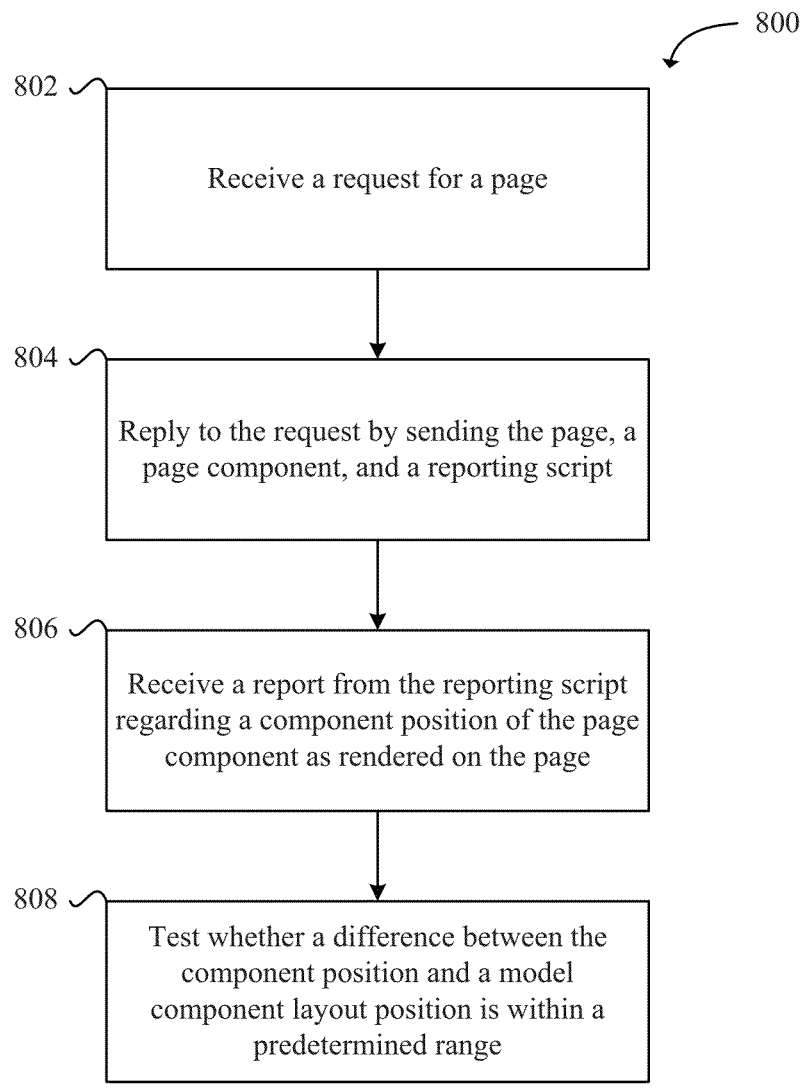
FIGS. 8A-C are flowcharts illustrating example methods of page rendering feedback.

FIG. 8A is a flowchart illustrating an example of a method 800 to test page rendering. The method 800 may include receiving a request for a page as shown in method element 802. For example, the request for the page may be made over an HTTP connection. Moreover, HTTP variants, such as secure HTTP (HTTPS) may be used in place of an HTTP connection where appropriate. Alternatives to HTTP are also envisioned as delivery mechanisms, including but not limited to, the Gopher protocol and the file transfer protocol (FTP). A client or a rendering device may make such requests and may include robots such as web crawlers used in search engines.

The method 800 may also include replying to the request by sending the page, a page component, and a reporting script as shown in method element 804. The page may be formed, for example, as a markup language such as HTML. Other rendering languages may be used to form the page including, for instance, XHTML, XML and/or SGML. With HTML the page component and the reporting script may be embedded by using appropriate HTML tags. Additionally, the reporting script may be an ECMAScript or a similar type of scripting language used for client-side scripting within pages and embedded within the HTML by using the script tag. The page component and the reporting script may be elements of the page.

Additionally, feedback or a report may be received from the reporting script regarding a component position of the page component as rendered on the page as shown in method element 806. The method 800 may further include testing whether a difference between the component position and a model component layout position is within a predetermined range, as shown in method element 808. The predetermined range may include a model bound, an outer bound, an inner bound and/or other boundaries used to represent predetermined ranges and to determine whether a page component within a page is acceptable.

Figure 8B:
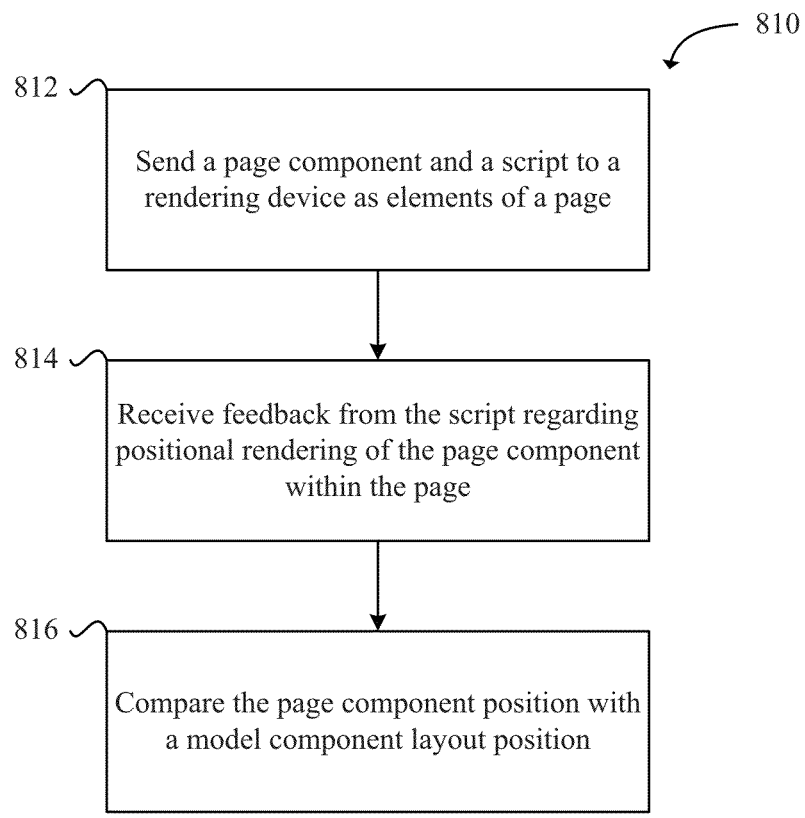

FIG. 8B is a flowchart illustrating an example of a method 810 for page rendering feedback. The method 810 may include sending a page component and a script to a rendering device as elements of a page, as shown in method element 812. With HTML, for instance, the page component and the reporting script may be embedded by using appropriate HTML tags. For example, the reporting script may be an ECMAScript, and the page component may include any of the various HTML elements that are often found within HTML documents.

The method 810 may also include receiving feedback from the script regarding positional rendering of the page component within the page, as shown in method element 814, and comparing the component position with a model component layout position to determine whether the component position was correctly rendered, as shown in method element 816. For example, positional rendering feedback and comparison may be provided, as previously discussed with reference to FIG. 5.

Figure 8C:
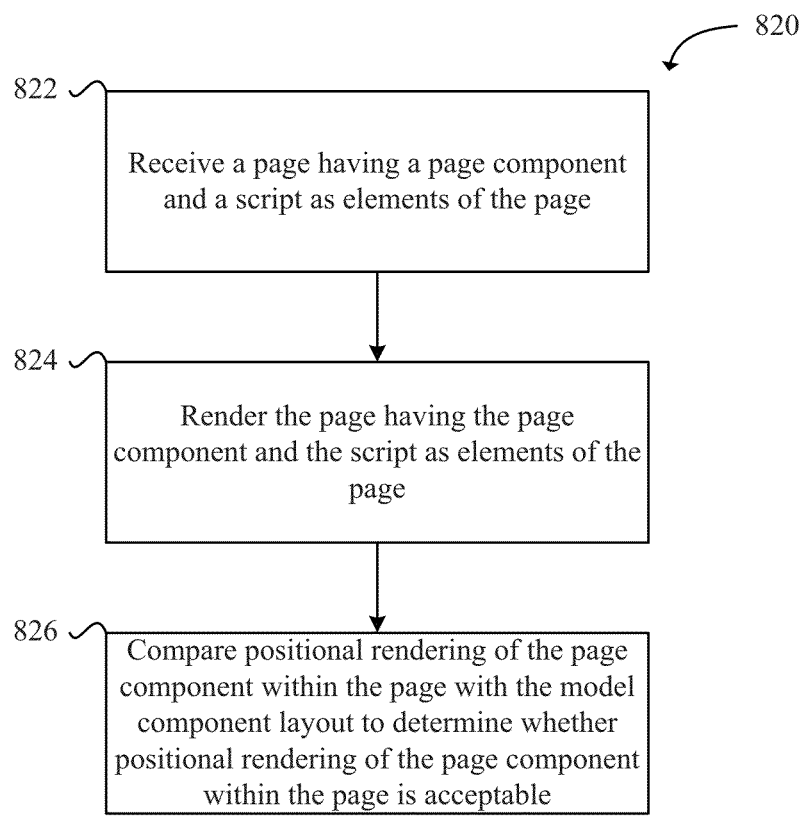

FIG. 8C is a flowchart illustrating an example of a method 820 to report page rendering information from a client device or rendering device perspective. The method 820 may include receiving a page having a page component and a script as elements of the page, as shown in method element 822. The method 820 may also include rendering the page having the page component and the script as elements of the page, as shown in method element 824. The method 820 may further include comparing positional rendering of the page component within the page against the model component layout to determine whether positional rendering of the page component within the page is acceptable, as shown in method element 826.

This technology may be able uncover page rendering and software errors. In particular, the technology may be used to discover errors introduced in modifying or adding to existing web application software. Moreover, the technology may be used to automatically test pages against various browsers and devices. In this way, regression testing of sites may be performed more effortlessly, and live reporting of untested issues that arise may even be provided. Further, the technology may work well with dynamically generated pages since page components tested on the dynamically generated page are evaluated at a component level. In particular, page components may be checked for whether they are positioned appropriately relative to the page, for instance. Thus, even page components as dynamic as advertising banners can be tested for accurate rendering on a page.

The technology may also be used to automatically detect issues within a site. For example, if a user comes across a page that renders incorrectly, a system may log incorrect rendering without intervention by the user. In this way, an administrator of the site may be able to review such issues in the aggregate and correct the issues. As another example, a site may be defaced as a result of an intrusion into the server hosting the site. The technology may be used to quickly inform site administration of the defacing.

The technology may also be used to provide a workaround for browsers having rendering issues with pages. Browsers with remote rendering (i.e., rendering that takes place on a centralized server and the completed rendered page is sent to the client), for instance, may be redirected to directly render a page if issues arise during the remote rendering of the pages. Additionally, browsers with remote rendering may be directed to employ a different rendering engine if issues arise during the remote rendering of the pages.

Figure 9:
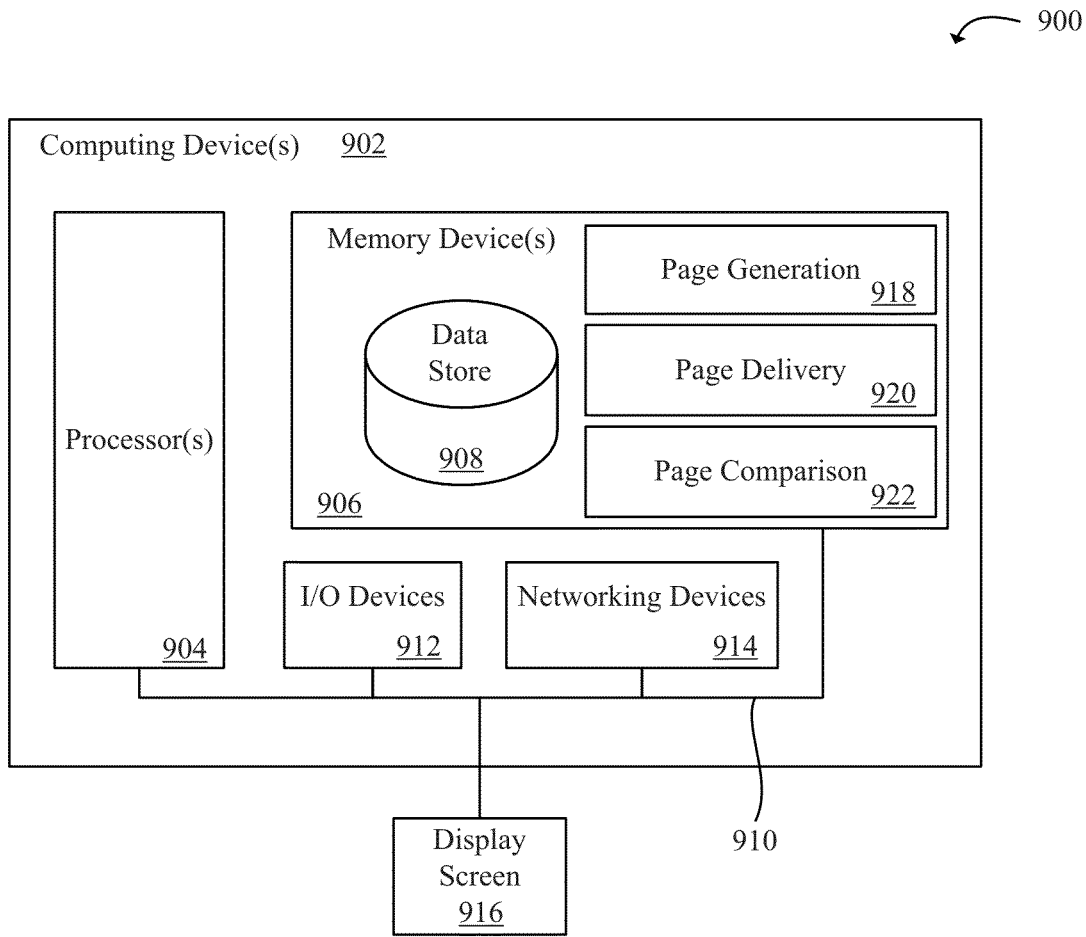
FIG. 9 is block diagram illustrating an example of a computing device that may be used for page rendering reporting.

FIG. 9 is block diagram 900 illustrating an example of a computing device 902 that may be used for page rendering reporting. In particular, the computing device 902 illustrates a high level example of a device on which modules of the disclosed technology may be executed. The computing device 902 may include one or more processors 904 that are in communication with memory devices 906. The computing device 902 may include a local communication interface 910 for the components in the computing device. For example, the local communication interface 910 may be a local data bus and/or any related address or control busses as may be desired.

The computing device 902, for instance, may be used to collect page rendering information. For example, the computing device 902 may be used to send a page component and a reporting script to a rendering device as elements of a page. The rendering device may then send a report regarding positional rendering of the page component within the page. The computing device 902 may then receive the report and compare the report with a model layout to determine whether the positional render of the page component within the page is acceptable. The computing device 902 may be further used, as outlined above, to report page rendering. For instance, the computing device 902 may be used to determine whether the rendering device is a robot.

In particular, the memory device 906 may contain modules that are executable by the processor(s) 904 and data for the modules. Located in the memory device 906 are modules executable by the processor. For example, a page generation module 918, a page delivery module 920, a page comparison module 922 and other modules may be located in the memory device 906. The modules may execute the functions described earlier. For instance, the page generation module 918 may retrieve static pages from a data store or may dynamically generate pages. The page generation module 918 may also retrieve pages from a remote server. Moreover, the page generation module 918 may generate at least the page component and the reporting script as elements of the pages. The page delivery module 920 may receive page requests and reply with the page. The page delivery module 920 therefore may include components such as an HTTP server, for instance. The page comparison module 922 may receive a report from the reporting script regarding positional rendering of the page component within the page. The page comparison module 922 may also compare the report with the model layout to determine whether positional rendering of the page component within the page is acceptable.

A data store 908 may also be located in the memory device 906 for storing data related to the modules and other applications along with an operating system that is executable by the processor(s) 804.

Other applications may also be stored in the memory device 906 and may be executable by the processor(s) 904. Components or modules discussed in this description that may be implemented in the form of software using high programming level languages that are compiled, interpreted or executed using a hybrid of the methods.

The computing device may also have access to I/O (input/output) devices 912 that are usable by the computing devices. An example of an I/O device is a display screen 916 that is available to display output from the computing devices. Other known I/O devices may be used with the computing device as desired. Networking devices 914 and similar communication devices may be included in the computing device. The networking devices 914 may be wired or wireless networking devices that connect to the internet, a LAN, WAN, or other computing network.

The components or modules that are shown as being stored in the memory device 906 may be executed by the processor(s) 904. The term "executable" may mean a program file that is in a form that may be executed by a processor 904. For example, a program in a higher level language may be compiled into machine code in a format that may be loaded into a random access portion of the memory device 906 and executed by the processor 904, or source code may be loaded by another executable program and interpreted to generate instructions in a random access portion of the memory to be executed by a processor. The executable program may be stored in any portion or component of the memory device 906. For example, the memory device 906 may be random access memory (RAM), read only memory (ROM), flash memory, a solid state drive, memory card, a hard drive, optical disk, floppy disk, magnetic tape, or any other memory components.

The processor 904 may represent multiple processors and the memory device 906 may represent multiple memory units that operate in parallel to the processing circuits. This may provide parallel processing channels for the processes and data in the system. The local interface 910 may be used as a network to facilitate communication between any of the multiple processors and multiple memories. The local interface 910 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method to test page rendering, comprising:
 under control of one or more servers having one or more processors and configured with executable instructions:
  receiving a request for a page at at least one of the one or more servers;
  replying, by at least one of the one or more servers, to the request by sending the page, a page component, and a reporting script, using at least one of the one or more processors, the page component and the reporting script being elements of the page;
  receiving a report at at least one of the one or more servers from the reporting script regarding a component position of the page component as rendered on the page;
  testing whether a difference between the component position and a model component layout position is within a predetermined range, using at least one of the one or more processors; and
  comparing positional rendering of the page component with stored historical ranges to determine whether positional rendering of the page component within the page is acceptable.

2. The method of claim 1, wherein the report further includes at least rendered window size, rendering software information, and rendering device information.

3. The method of claim 1, wherein the report further includes a component type descriptor identifying the page component.

4. The method of claim 1, further comprising testing relative positions of a plurality of page components and whitespace as rendered on the page against the model component layout position.

5. The method of claim 1, further comprising determining whether a client requesting the page is a non-human by performing at least one of: counting a number of false positives for the component position of the page component as rendered on the page; identifying a robot using a User-Agent header; or identifying a robot through a list of Internet Protocol addresses of common or known robots.

6. A method for page rendering feedback, comprising:
 under control of one or more servers having one or more processors and configured with executable instructions:
  sending a page component and a script from at least one of the one or more servers distributing the page component and the script to a rendering device as elements of a page, using at least one of the one or more processors;
  receiving feedback at at least one of the one or more servers from the script regarding positional rendering of the page component within the page;
  comparing the page component position with a model component layout position using at least one of the one or more processors; and
  comparing positional rendering with stored historical ranges to determine whether positional rendering of the page component within the page is acceptable.

7. The method of claim 6, further comprising comparing feedback with a model layout to determine whether positional rendering of the page component within the page is acceptable.

8. The method of claim 6, wherein the feedback further includes at least rendered page size, rendering software information, rendering device information, or version information.

9. The method of claim 6, wherein the feedback further includes a layout identifier identifying a layout instance of the page component.

10. The method of claim 6, further comprising testing relative positions of a plurality of page components as rendered on the page.

11. The method of claim 6, wherein the page is an application page.

12. The method of claim 6, wherein determining whether positional rendering of the page component within the page is acceptable comprises using machine learning.

13. A method to report page rendering information, comprising:
 under control of one or more servers having one or more processors and configured with executable instructions:
  receiving a model component layout and a page from at least one of the one or more servers, the page having a page component and a script as elements of the page;

rendering the page having the page component and the script as elements of the page, using at least one of the one or more processors;

comparing positional rendering of the page component within the page output from the script with the model component layout using at least one of the one or more processors to determine whether positional rendering of the page component within the page is acceptable; and requesting the page from across an internet to determine whether the page is masquerading as a trusted page by comparison with the model component layout.

14. The method of claim 13, further comprising sending to at least one of the one or more servers whether positional rendering of the page component within the page is acceptable as initiated by the script.

15. The method of claim 13, further comprising rendering the page with a plurality of rendering engines or devices.

16. The method of claim 15, further comprising rendering a linked page with the rendering engines or devices by following a link in the page.

17. A page rendering reporting system, comprising:
one or more processors;
a memory device including instructions to be executed by at least one of the one or more processors;
a page generation module having executable instructions to use at least one of the one or more processors to generate a page with at least a page component and a reporting script as elements of the page;
a page delivery module having executable instructions to use at least one of the one or more processors to reply to page requests with the page;
a page comparison module having executable instructions to use at least one of the one or more processors to receive a report from the reporting script regarding positional rendering of the page component within the page and compare the report with a model layout to determine whether positional rendering of the page component within the page is acceptable; and
a phishing detection module to request the page from across an internet, wherein the page comparison module is used to determine whether the page is masquerading as a trusted page by comparison with the model layout.

18. The system of claim 17, further comprising an automated test module to automatically render the page with a plurality of rendering engines or devices.

* * * * *